United States Patent [19]
Phillippi

[11] Patent Number: 5,377,620
[45] Date of Patent: Jan. 3, 1995

[54] CAROUSEL ANIMAL FEEDER

[76] Inventor: Daniel J. Phillippi, 1440 W. 34th North, Wichita, Kans. 67204

[21] Appl. No.: 119,625

[22] Filed: Sep. 13, 1993

[51] Int. Cl.⁶ ............................................. A01K 5/00
[52] U.S. Cl. ............................................... 119/51.12
[58] Field of Search ............... 119/51.01, 51.11, 51.12, 119/51.13, 51.14, 51.15, 51.5

[56] References Cited

U.S. PATENT DOCUMENTS

| | | | |
|---|---|---|---|
| 3,826,231 | 7/1974 | Crawford et al. | 119/51.12 |
| 4,249,483 | 2/1981 | Sobky | 119/51.12 |
| 4,450,790 | 5/1984 | Stansbury, Jr. | 119/51.12 |
| 4,617,874 | 10/1986 | Zammarano | 119/51.12 |
| 4,671,210 | 6/1987 | Robinson et al. | 119/51.12 |
| 4,805,560 | 2/1989 | Knego et al. | 119/51.12 |
| 4,981,106 | 1/1991 | Nagamoto | |

*Primary Examiner*—Gene Mancene
*Assistant Examiner*—Thomas Price
*Attorney, Agent, or Firm*—Rick Martin

[57] ABSTRACT

A feeder for automatically providing an animal access to measured amounts of feed at predetermined time intervals. A carousel having a number of trapezoidally shaped feed compartments arranged around a central axis is carried by rollers engaged on a circular track. A cover has an opening defining a feeding station. A motor and timer combination operable with low voltage DC current periodically move each compartment into registry with the opening to provide the animal access to the feed. Each compartment is divided into a relatively small trough and a larger trough. After a compartment has remained at the opening for a predetermined time, the carousel is rotated to bring the next adjacent compartment into registry with the opening and to move the previous carousel out of registry with the opening.

8 Claims, 4 Drawing Sheets

CAROUSEL ANIMAL FEEDER

This invention relates to animal feeders and more particularly to a feeder for automatically providing an animal such as a horse access to feed over a period of time in incremental amounts at timed intervals.

Horses particularly, but also virtually all other animals to at least some degree, are sensitive to the kind and amount of feed available to them. A horse's digestive system requires that the horse be fed relatively small amounts of a balanced ration at regular intervals. Its stomach is relatively small and the retention time for feed in the digestive tract is extremely short in comparison with many other mammals. The horse evolved as an animal which grazed substantially constantly to take in small amounts of forage over relatively long periods of time. Accordingly, it is important that a confined horse have substantially constant access to hay to maintain proper flow through the digestive tract and to approximate the constant grazing conditions for which the horse's digestive tract is suited.

Moreover, a horse's digestive tract requires that the horse be fed relatively uniform amounts and that the feed be wholesome. Abrupt changes in the amount of feed given to a horse can have severe adverse consequences. Horses are subject to colic or even founder if the ration is increased too rapidly. Therefore, it is highly desirable that any uneaten portion of a previous feeding be removed from access by the horse before the next quantity of feed is made available to it. Also, feed uneaten from the previous feeding may become spoiled from exposure to the weather or the like. This is a further reason for removing the uneaten feed before more feed is given to the animal.

Work, travel and other commitments often dictate that owners or caretakers cannot be present to feed their horses in the manner and at times which are required for the well being of the horses. Some attempts have been made to automate the feeding of horses at predetermined, timed intervals. These have been generally unsuccessful, so far as applicant is aware, largely because they have not been able to reliably deliver feed of the proper type, combination and in proper amounts to the horses.

Some automatic feeders are of a type which may be programmed to meter a predetermined amount of feed into a trough or other feeding station at predetermined times from a feed storage bin or hopper. Molasses is often a constituent of horse feed because of its high energy content and because it improves palatability and helps to hold the fines together along with the vitamins and minerals which may be added to the feed. Molasses containing, or "sweet" feeds are a major problem for metering feeders of this type. The molasses content of the feed tends to gum up the metering mechanism, causing stoppages and damage to the feeder, and rendering such feeders so unreliable that they cannot be safely used without close operator attention. This, of course, renders such feeders of virtually no practical use for the purposes required.

Another defect of feeders of this type is that they cannot effectively furnish a desired quantity of hay to the horse to provide a proper ration. Most such feeders do not even attempt to feed hay. The sheer bulk of quantities of hay required in the horse diet usually dictates that hay not be handled by metering feeders. Rather, a large charge of hay sufficient for feeding the horse throughout the entire period the horse owner expects to be absent is generally placed into a self-feeder accessible at all times to the horse. The hay is often exposed to rain, snow, sleet and the like which may damage the hay, or at least render it less palatable. Also, the horse may waste a relatively high percentage of the hay when feeding from a large supply, making it preferable to provide the hay to the horse in smaller increments sufficient only to provide a proper amount for feeding the horse during the interval between successive feedings.

Accordingly, the need for a truly reliable feeder for horses has resulted in the present invention. It is an important object of this invention to provide a feeder which reliably provides an animal with successive feedings, at predetermined timed intervals.

Another very important object of the present invention is to provide a feeder which is capable of reliably providing, in timed increments, both the hay and the concentrated feed constituents of a horse's ration.

Yet a further important object of this invention is to provide a feeder which presents the feed to the animal for its consumption at intervals which may be pre-set and pre-programmed so that the feeder is adaptable for use with any of a variety of horses which may require different diets, or for use to feed animals other than horses.

Another object of the present invention is to provide a feeder constructed to permit individual ration increments to be preloaded into their respective troughs from which the animal will feed, and to permit the timed, periodic presentation of each increment to the animal without the necessity for moving the feed relative to the feed trough, thereby preventing malfunctions from the use of sticky feeds or from feeding hay in the feeder.

A yet further important aim and objective of the present invention is to provide a feeder wherein both concentrated feed and hay can be fed simultaneously to the animal without the necessity for mixing the hay with the concentrated feed and without a substantial likelihood that they will become inadvertently mixed together.

Still another object of the present invention is to provide a feeder which presents feed to horses in a position which permits the horse to eat in a posture approximating that which is naturally assumed by the horse while grazing, thereby preventing physiological disorders commonly associated with the feeding of horses.

In the attainment of the foregoing objects, it is a very important object of this invention to provide a feeder which is electrically operated to permit the use of motors and timers to obviate the necessity for operator attention and manual manipulation, yet which utilizes relatively safe, 12 volt electricity to insure that the animals having access to the feeder are not exposed to dangerous electrical currents.

These and other important aims and objectives of this invention will be further explained or will become apparent from the following description and from the figures of the drawings, wherein.

Figure 2:
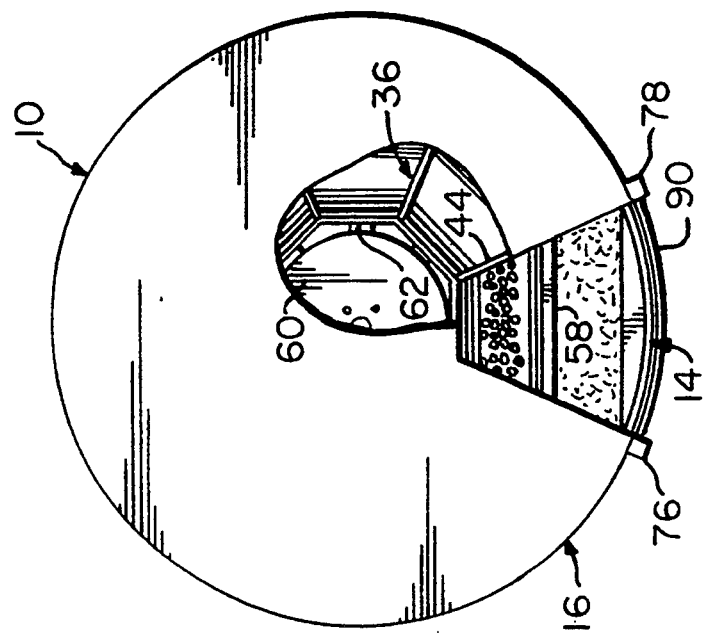
FIG. 2 is a top plan view of the feeder on the scale of FIG. 1, parts being broken away to reveal details of construction.

A feeder embodying the principles of this invention is broadly designed by the reference numeral 10 and includes a stationary base 12, a carousel 14 mounted for rotation on base 12 and a cover 16 which is preferably at least releasably fixed to the base. Base 12 includes an elongated, tubular, rigid circular member 18 and a pair of elongated, rigid, intersecting members 20 and 22 having their respective ends welded to member 18 and disposed co-planar therewith to define a reenforced circular base for the feeder which is adapted to be supported on a surface such as the ground or on a floor or the like.

Figure 3:
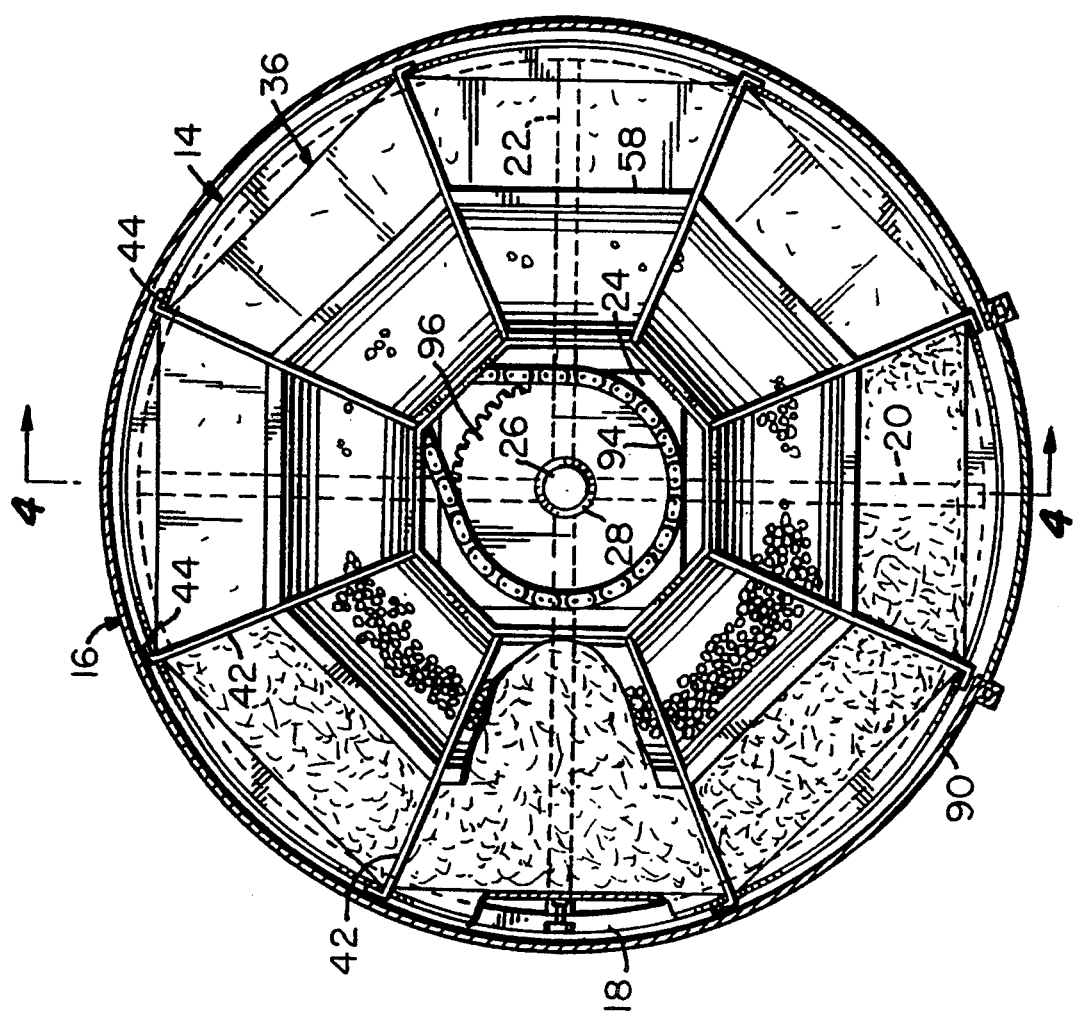
FIG. 3 is detailed horizontal cross-sectional view taken along line 3—3 of FIG. 1, parts being broken away to reveal details of construction.
Figure 4:
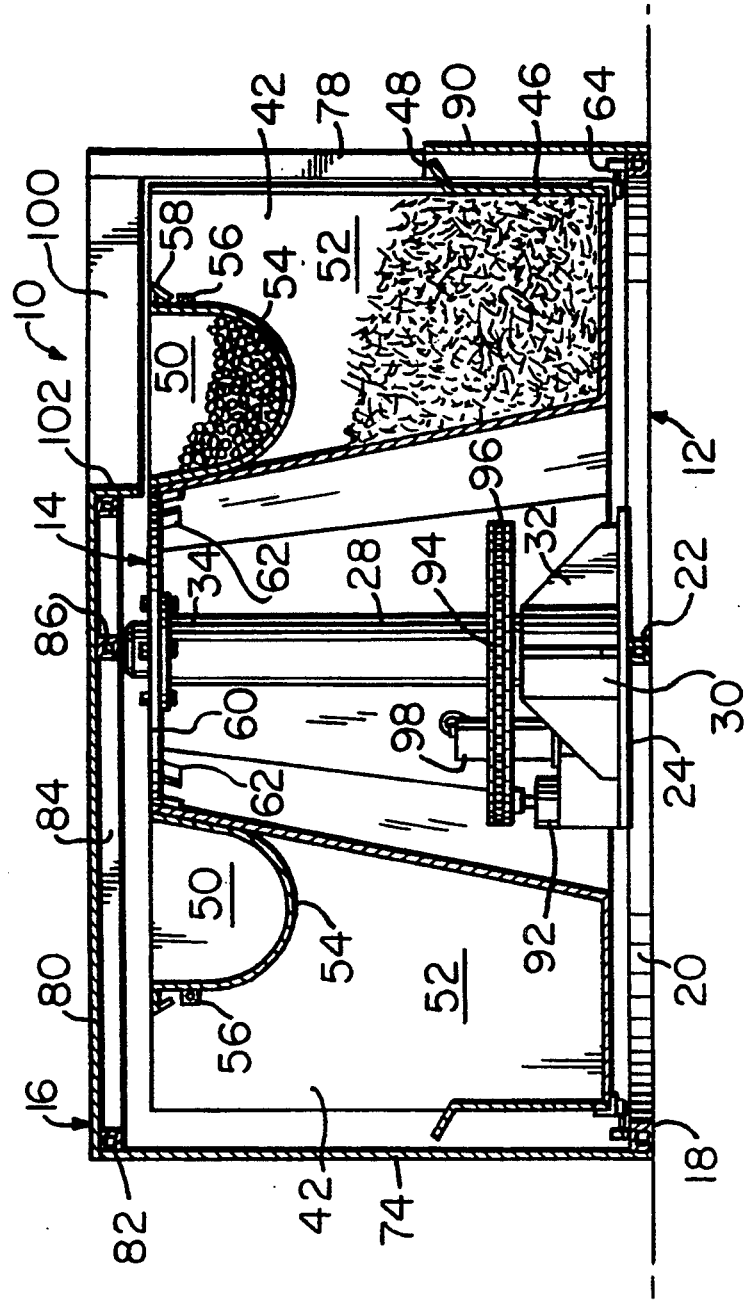
FIG. 4 is a detailed vertical cross-sectional view taken along line 4—4 of FIG. 3.
Figure 6:
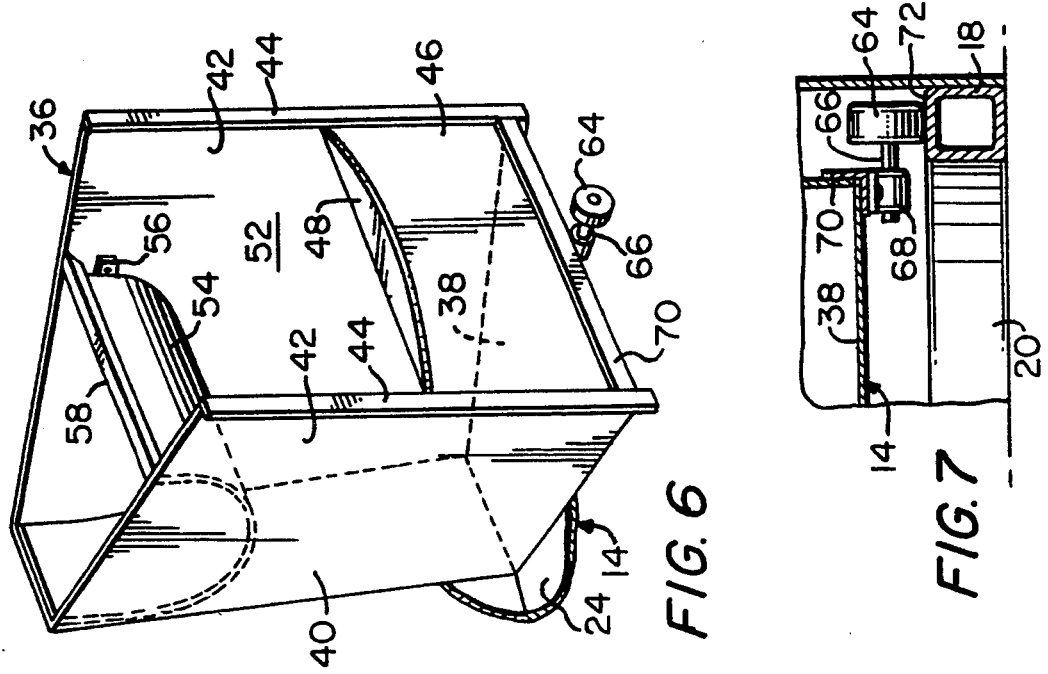
FIG. 6 is a fragmentary perspective view of the carousel showing one of the feeding compartments.

A flat plate 24 is rigidly secured by welding or the like to members 20 and 22 proximal the intersection of the latter as shown in FIGS. 3 and 4 of the drawing. Plate 24 supports an upright shaft 26 having its lowermost end welded or otherwise rigidly secured to the upper surface of plate 24. The shaft rotably mounts at its uppermost end by a bearing (not shown) an elongated, cylindrical tube 28 which is concentric with the shaft and rotates relative to the latter. The lowermost end of tube 28 is telescopically received within a tubular retainer 30 which is rigidly carried by plate 24 concentric with shaft 26 and is supported in its upright position by a plurality of peripherally spaced apart gussets 32 shown best in FIG. 4 of the drawing. The gussets are welded to plate 24 and to retainer 30. Suitable bearings (not shown) associated with retainer 30, shaft 26 and tube 28 may be utilized to stabilize the tube against any lateral or vertical movement as may be required and as will be recognized by those skilled in the art. A flange 34 rigidly secured to tube 28 as by welding or the like projects radially outwardly therefrom as shown in FIG. 4 of the drawing. Flange 34 rotates with tube 28 as the latter is rotated about shaft 26.

Carousel 14 comprises a plurality of preferably identical, generally trapezoidally shaped containers or compartments 36 disposed in side by side arrangement generally defining a circle as is illustrated in FIG. 3 of the drawing. Compartments 36 are preferably constructed of relatively durable sheet material such as aluminum, stainless steel or the like and each compartment has a planar bottom 38, a rear wall 40 and spaced apart sidewalls 32. As shown best in FIG. 3 of the drawing, adjacent compartments share the sidewall 42 therebetween. Each proximal 42 has a flange 44 extending at a right angle from the major plane or the sidewall and along the outboard edge of the wall to rigidify the latter.

A front wall 360 is secured between each pair of flanges 44 and the uppermost end of wall 46 terminates in an outwardly bent, curved flange 48 which is disposed well below the uppermost ends of sidewalls 42 as shown in the drawings. Flange 48 helps rigidify wall 46 and provides a lip presenting an animal with a relatively smooth surface beneath its head and neck when feeding from the compartment 36. This serves to minimize the chance for injury to the animal.

Compartment 36 is divided into a pair of feed troughs 50 and 52 by a curved member 54 secured to the upper region of rear wall 40 and bent in generally "U" shaped configuration downwardly and back up to the top of sidewalls 32 as shown in the drawings. Member 54 may be welded to the sidewalls or each member may have flanges such as the flanges 56 shown in the drawings. The flanges 56 may be integral with or are at least secured to the member and adapted to be secured to the proximal wall 42 by bolts or other suitable fasteners. The upper and outer end of member 54 is bent as shown to present a rigidifing flange 58 across the front of trough 50. This also presents a smooth surface to permit an animal to feed from the trough without likelihood of injury.

It will be readily understood by those skilled in the art that the compartment and trough defining walls of sheet material may be secured together by any suitable means. The adjoining edges of the walls may be butted and welded or the walls may be formed with suitable integral flanges to facilitate their interconnection by welding or to permit the components to be bolted together or fastened by screws, rivets or the like.

Figure 7:
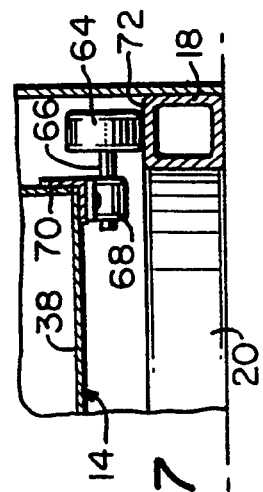
FIG. 7 is a further enlarged, fragmentary detailed cross-sectional view through the feeder illustrating a carousel support roller on the track.
Figure 5:
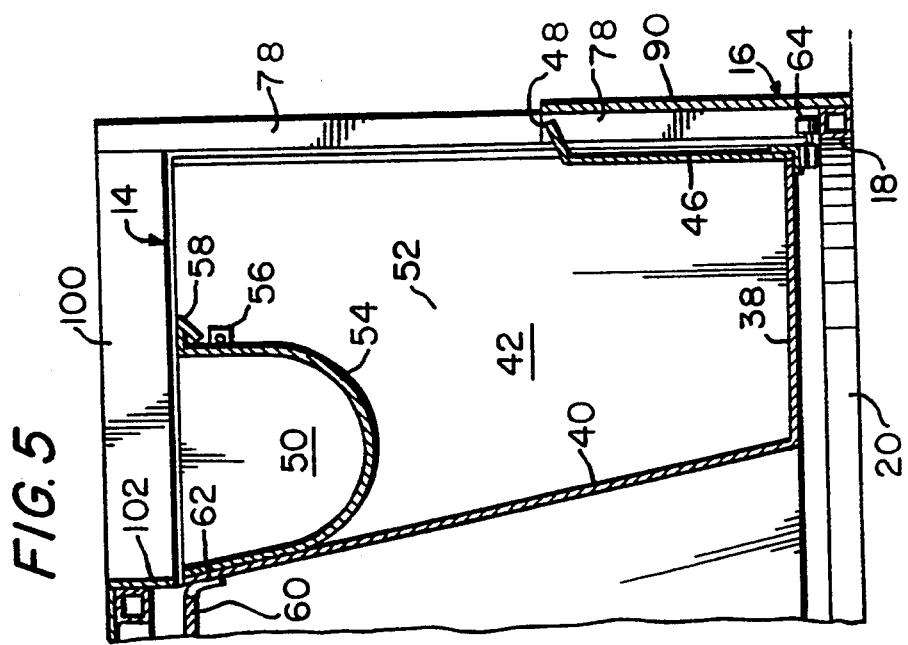
FIG. 5 is a fragmentary, enlarged, cross-sectional view through the feeder showing one of the compartments of the carousel at the feeding station.

A circular plate 60 (FIGS. 2 and 4) is bolted to flange 34 and is secured to the respective rear walls 40 of feeding compartments 36 by a plurality of tabs 62 which may be welded or otherwise secured to plate 60 and the corresponding compartment wall 40. This mounts carousel 14 on tube 28 for rotation by the latter. The weight of the carousel and the contents thereof is primarily borne by a plurality of rollers 64 spaced apart peripherally around the carousel. Each roller 64 is rotably mounted on a stub shaft 66 which is carried by a bracket 68 rigidly affixed to each compartment and preferably about midway between the ends of a generally horizontally extending angle member 70 secured between the upright flanges 44 which defines the front side edges of each compartment. Angle member 70 spans the distance between flanges 44. The circular base member 18 has a flat upper surface 72 (FIG. 7) providing a track upon which rollers 64 roll as carousel 14 is rotated.

Figure 1:
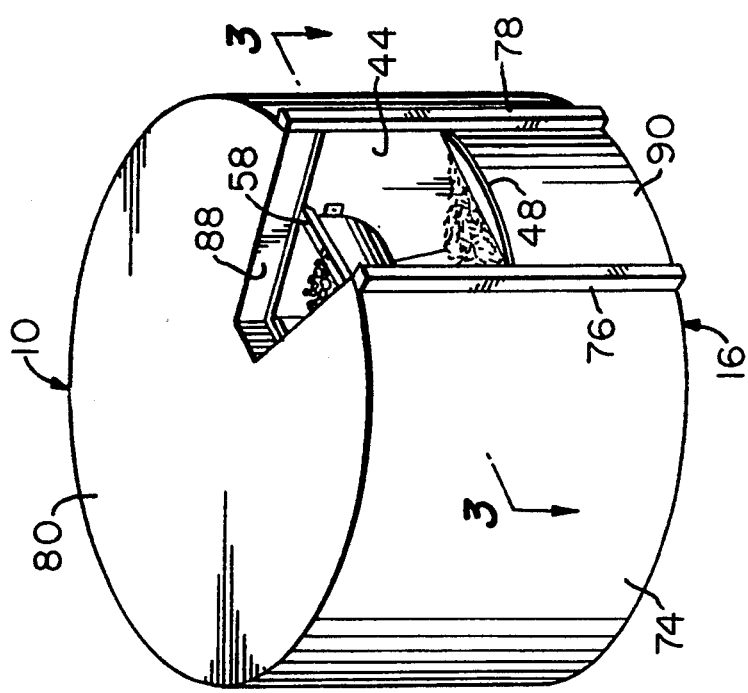
FIG. 1 is a perspective view, on a reduced scale of a feeder embodying the principles of this invention.

Feeder 10 includes a barrier in the nature of cover 16 comprised of a circular wall member 74 of preferably sheet metal secured to the circular base member 18 and extending therearound except at the front of the feeder. One end of wall member 74 is secured to an elongated rigid, preferably tubular member 76 having its lowermost end rigidly secured to the outermost surface of circular member 18 and projecting upwardly therefrom as shown best in FIGS. 1 and 2 of the drawing. A like member 78 extends upwardly in peripherally spaced apart parallelism with member 76 to define therebetween an opening in the cover.

A generally circular top plate 80 of sheet material such as sheet metal is disposed in enclosing relationship across the uppermost end of wall member 74. Cover 16 is stabilized by a circular, rigid, tubular frame member 82 secured to the uppermost edge of wall 74 and the proximal outermost edge of top plate 80. Elongated rigid, preferably tubular members 84 and 86 are disposed in intersecting, co-planar relationship as shown in FIG. 4 of the drawing and have their opposite ends secured as by welding or the like to the circular member 82. It will be readily understood that the members 84 and 86 support the relatively thin sheet material of top plate 80 to rigidify the cover.

A trapezoidal notch 88 in the top plate 80 has substantially the same shape as the cross-section of each compartment 36. A curved plate 90 which is preferably of substantially heavier gauged material than that of wall member 74 and top plate 80 spans the distance between upright member 76 and 78 at the front of the feeder and is rigidly secured to the members to provide a relatively rugged kick plate capable of withstanding impact by a horse or other animal with which the feeder is to be used. The uppermost edge of plate 90 terminates at about the same vertical height as the upper flange 48 of each compartment wall 46. The upper portions of members 76 and 78 combine with the peripheral edge of notch 88 to define an opening in cover 16 which presents a feeding station at this location. Since cover 16 is stationary, the feeding station is also stationary. A pair of depending flanges 100 at opposite sides of notch 88 and a flange 102 are secured to top plate 80 and depend downwardly therefrom to close the opening against the ingress of animals or birds into the remainder of the feeder while each compartment is at the feeding station.

Means for rotating carousel 14 on its track comprises an electric motor 92 mounted on plate 24 which is operably coupled through a drive chain 94 to a sprocket 96 rigidly secured to tube 28. Motor 92 is electrically coupled to a suitable source of electrical power, preferably 12 volt DC from a storage battery or the like, through a timer 98. Timer 98 is of a type which may be selectively set for energizing motor 92 for an interval sufficient to permit the latter to rotate carousel 14 a predetermined distance followed by deenergizing the motor for a predetermined period of time and then subsequently reenergizing the motor for another cycle. The timer continues the sequence as may be required and the time interval of deenergizing the motor between increments of advancement of the carousel by the motor may be selectively varied by presetting the timer as may be desired. Motors and timers having the foregoing capabilities are available commercially, are known to those skilled in the art and need not be further described in detail.

In the operation of feeder 10, base 12 is placed on a supporting surface in a position which will be accessible to the animal or animals to be fed by the feeder. The individual compartments 36 are charged or loaded with the ration which is to be fed to the animals during the respective intervals which are desired for feeding. Typically, each compartment 36 may be charged with the desired ration for an animal such as a horse or the like. Since it is often desirable to provide a ration of a relatively concentrated energy feed to horses as well as bulky roughage in the form of hay or the like for more or less continuous eating by the animal, the concentrated feed (which may be grain or other feed combination) can be put in the relatively small trough 50 and the bulkier hay can be accommodated by the relatively large trough 52. If cover 16 is releasably attached to the base, it can be removed to permit access to the carousel for convenient loading of the compartments. Alternatively, if cover 16 is relatively permanently fixed to the base, each compartment 36 can be sequentially advanced to the loading station by operating the electrical controls in a manner to override timer 98 for this purpose as will be readily understood by the those skilled in the art.

Once the feed is in the compartments with the cover on the feeder, the compartments are thereafter automatically sequentially advanced to register, in turn, with the opening in the cover. The cover serves as a barrier protecting the feed in the other compartments from the weather, varmints and from premature consumption by the animal to be fed by the feeder. While each compartment is held at the feeding station by deenergization of motor 92 by timer 98, the animal has access to the feed contained in that compartment.

It should be noted that the opening in the feeder permits access from above and at the front of the feeder so that a horse can feed from the troughs in the respective compartments with its head and neck extending downwardly. This is a natural grazing position for horses and it is desirable to permit the horse to feed in this position. Physiologically, the horse's windpipe is sufficiently closed in this downwardly extending position to permit the horse to swallow its feed without significant risk of choking or "sucking air".

The curved bottom configuration of trough 50 insures that the animal can reach all regions of the trough to eat the feed contained therein. The horse can nibble from the hay in trough 52 throughout the entire period that the compartment remains at the feeding station. As pointed out above, access to feed of this type substantially at all times is desirable for animals such as horses. Confined horses tend to experience boredom and are subject to acquiring habits such as gnawing on available wooden items or the like if they are deprived of the ability to feed for substantial periods during confinement.

If the feed in a compartment is not fully consumed by the animal during the appropriate period for any reason, the uneaten feed is moved with that compartment out of registry with the feeding station at the end of the dwell period when the next adjacent compartment is automatically rotated into registry with the feed station. This insures that any spoiled feed or feed which has otherwise become contaminated in some manner is removed from the animal. It also insures that the animal will only have the desired, quantity of feed available to it for the period of time when such next adjacent compartment is permitted to dwell at the feed station.

The feeder selected for illustration and description in this application has a total of eight compartments. This number permits the automatic feeding of an animal in the manner described for a substantial time period. It is contemplated that each compartment would probably be permitted to dwell for perhaps one half day before advancement of the carousel to move the next compartment to the feeding station although, of course, other periods could be selected if desired. It will be understood by those skilled in the art that feeder 10 could be constructed with as many or as few compartments as might be desired without departing from the spirit of this invention. Further, the dimensions of the components could be changed as might be desired to increase or decrease the sizes of the feed compartments, the sizes of the troughs, the size of the opening for the feeding station and other features as may be desirable to accommodate whatever animal or animals are to be fed by means of the feeder.

Each feeding period's ration is contained in its own, individual trough and compartment until made available to the animal. Thus, the feed is not physically moved relative to its compartment after it is put into the carousel and the animal consumes the feed directly from that compartment. This eliminates the problems inherit in moving feed such as those which contain molasses and the problems of metering relatively bulky feed such as hay and the like. Instead, these materials are carried by the carousel separately and individually to the feeding station. Any residue of the feed is then carried from the feeding station and into a position beneath the cover where the latter serves as a barrier to keep the feed from access by the animal after it has been exposed for the appropriate period of time.

While the feeder shown in the drawings and heretofore described in the specification is driven by means of a chain and sprocket drive, it should be understood that other drive means can be utilized as well. For example, a worm gear connection between the motor and carousel can be used if desired. In such event motor 92 and its associated worm gear could be mounted on or near the top of the central shaft and coupled in driving relationship with the carousel.

It should be pointed out that the all metal construction of the feeder and the relatively open compartments and troughs of the carousel make the cleaning of the unit rather easy. Cleaning should be carried out at least every time the unit is used for a different individual horse or other animal. With the cover removed, the components of the feeder can be relatively easily washed by pressurized water or steam as may be desired.

Having thus described the invention, I claim:

1. An animal feeder comprising:
   a base comprising a support adapted to be positioned on a supporting surface, and an upright shaft mounted on the support;
   a carousel rotatably mounted on the shaft for rotary movement about the latter, there being a plurality of compartments carried by the carousel and disposed generally in a circular arrangement concentric to the shaft;
   a cover extending over the compartments, said cover having an opening therethrough at a position to provide an animal access to a compartment at said position when the latter is moved to the position by rotation of the carousel about the shaft;
   means operably coupled with the carousel for rotating the latter at predetermined, timed intervals with one of said compartments being positioned beneath the opening during each interval, whereby to provide an animal access through the cover to eat feed from said compartment during said interval; and
   said compartments each consisting of a volume substantially adequate for feeding a horse for half a day, and a height of a naturally grazing horse's mouth, and an upper feed trough.

2. The invention of claim 1, wherein is included a track mounted on the base, and wherein the carousel includes wheels carried by the latter and disposed to engage the track for supporting the carousel as the latter is rotated about the shaft by said rotating means.

3. The invention of claim 2, wherein said rotating means includes a 12 volt electric motor.

4. The invention of claim 3, wherein the rotating means includes an electrically operated timer operably coupled with the motor for energizing the latter at selected, timed intervals.

5. A horse feeder comprising:
   a rotating carousel consisting of a plurality of substantially trapezoidal compartments;
   said compartments each consisting of a volume substantially adequate for feeding a horse for half a day;
   said compartments each further comprising a small upper feed trough and a large lower feed trough, the lower feed trough having a height of a naturally grazing horse's mouth;
   a circular base having an outer periphery;
   a circular support wall atop said outer periphery;
   a top cover atop said circular support wall;
   said top cover further comprising a substantially trapezoidal notch having a shape equal to a horizontal cross section of said trapezoidal compartment;
   a motor and a transmission means to rotate the carousel, whereby said trapezoidal compartments sequentially coincide with said notch; and
   a timer means to power the motor means at predetermined intervals, whereby relatively small amounts of a balanced ration of foods is presented to the horse in relatively uniform amounts.

6. The feeder of claim 5 wherein said transmission means further comprises a stop position having a force resistance means capable of withstanding a rotational force from a horse's nose.

7. The feeder of claim 6 wherein said force resistance means further comprises a drive chain and a sprocket which urge a vertical shaft to rotate the carousel.

8. The feeder of claim 6 wherein said compartments further comprise a set of sequential numbers, thereby enabling the determination of whether the horse went off his feed.

* * * * *